UNITED STATES PATENT OFFICE.

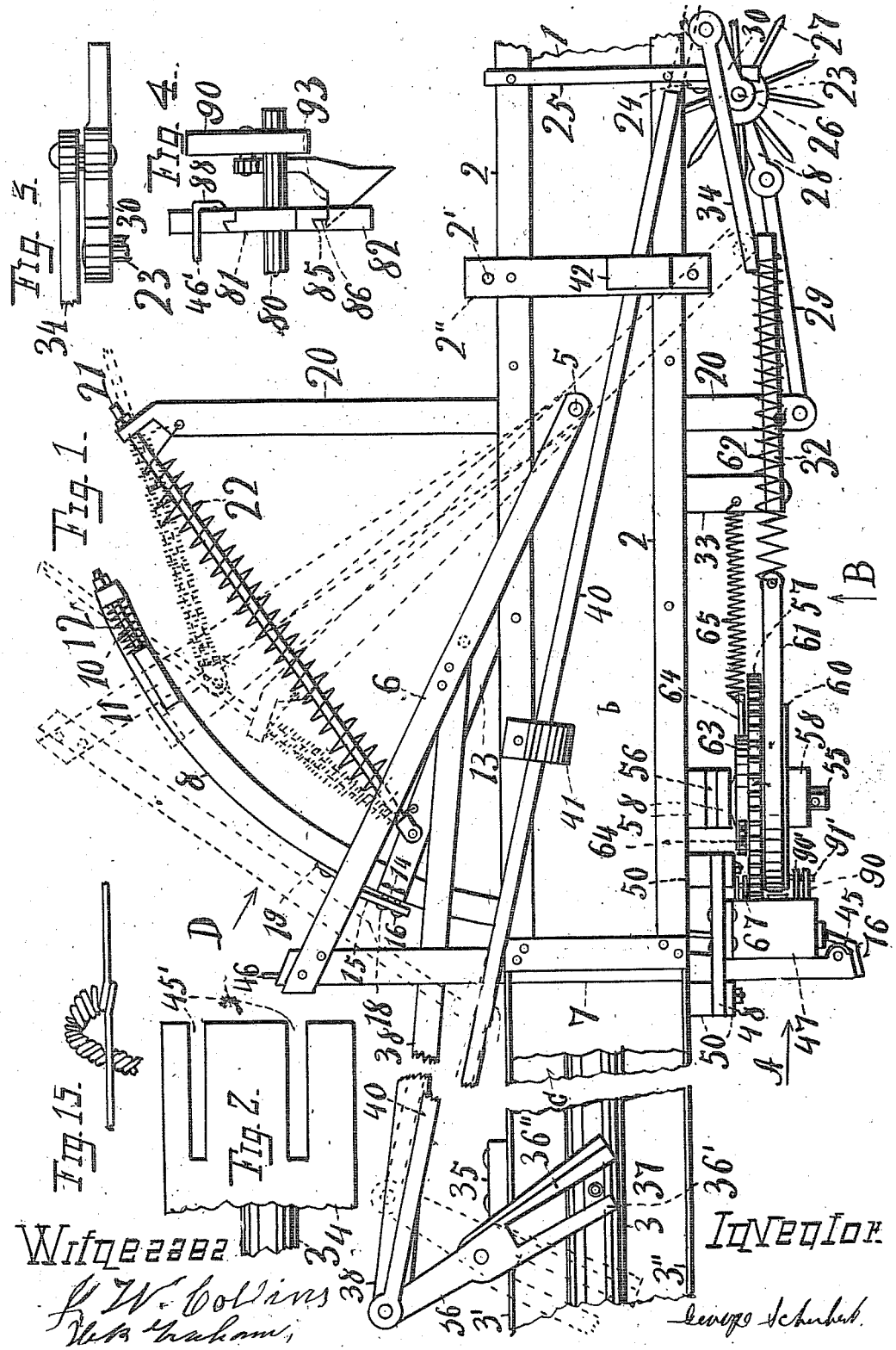

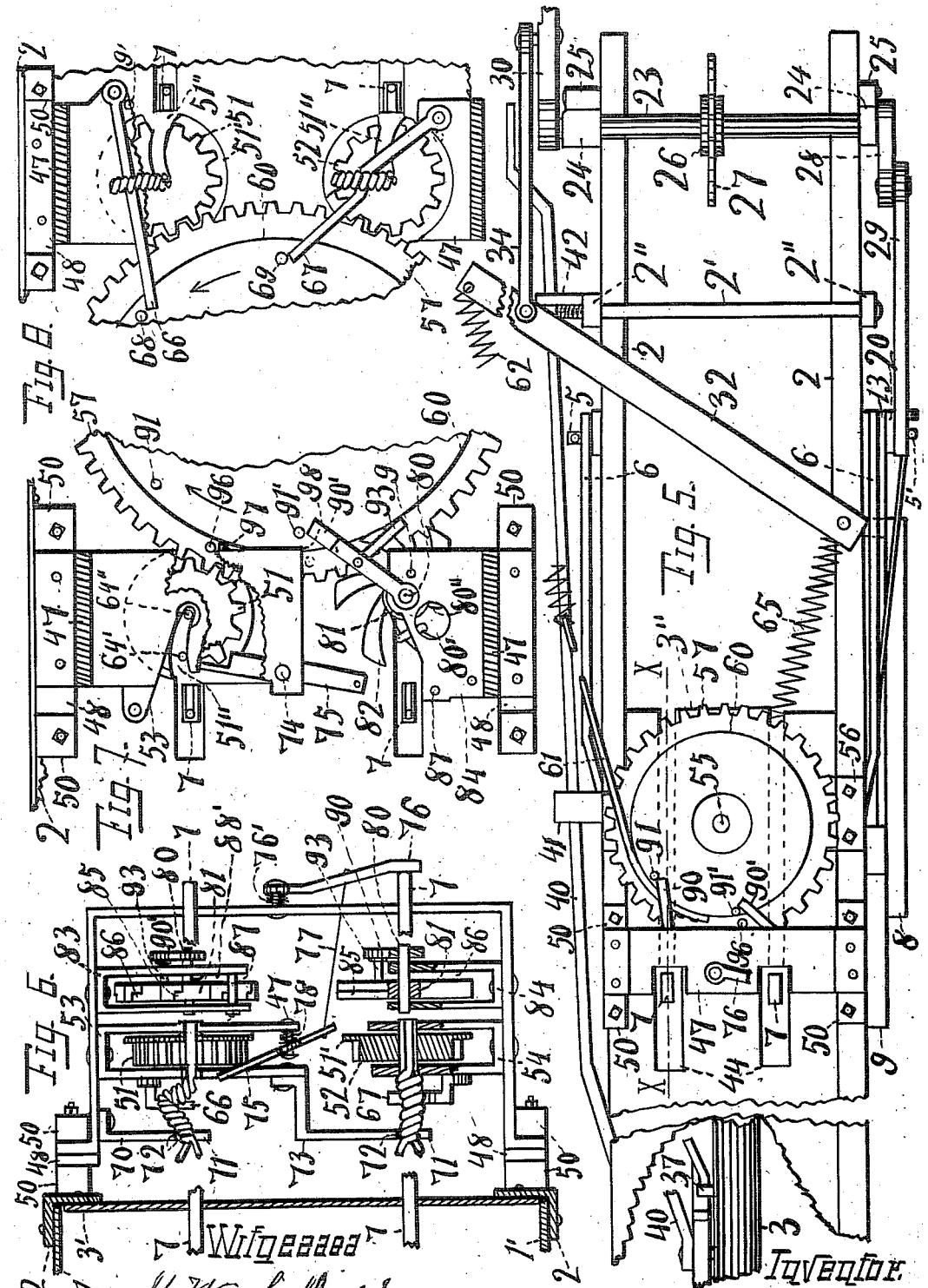

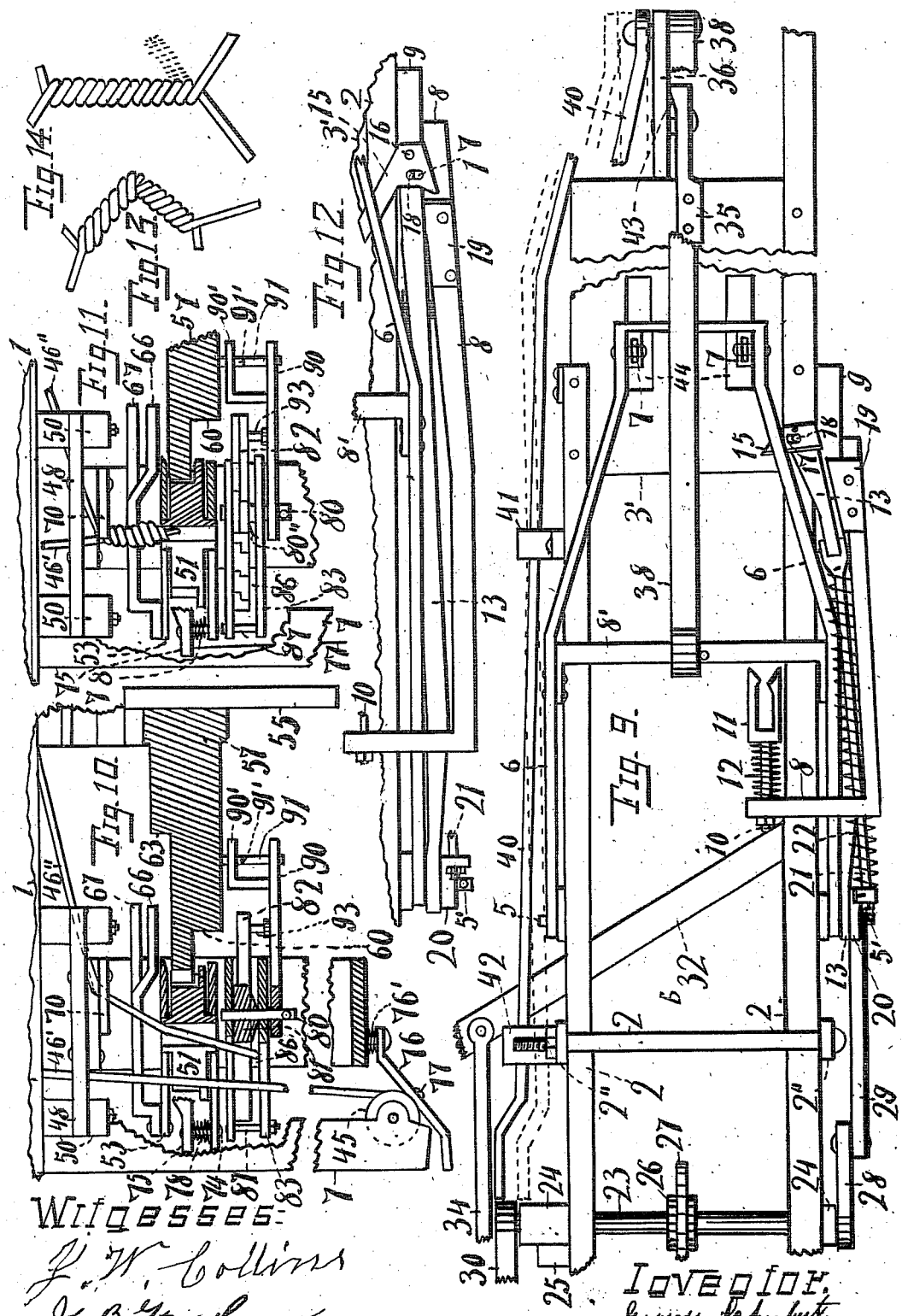

GEORGE SCHUBERT, OF FORT WORTH, TEXAS.

BALE-WIRING MECHANISM.

994,661. Specification of Letters Patent. Patented June 6, 1911.

Application filed November 4, 1909. Serial No. 526,308.

*To all whom it may concern:*

Be it known that I, GEORGE SCHUBERT, a citizen of the United States, residing at Fort Worth, in the county of Tarrant and State of Texas, have invented a new and useful Bale-Wiring Mechanism, of which the following is a specification.

My present invention relates to improvements in a bale wiring mechanism, for baling presses, and also to an improved tie which can be made by simple mechanism and without weakening the wire, and can be formed as near adjacent the bale as may be desired. I attain these objects by the mechanism illustrated in the accompanying drawings in which—

Figure 1 is a plan view of the body part of a press provided with my improvements. Fig. 2 is a side view of the plunger, showing the extent of the slots in which the needles operate. Fig. 3 is a side view of the crank and connecting rod to operate the tying mechanism and to also trip the needles, and showing the entire length of the extension of said crank. Fig. 4 is an enlarged detail view of one of the disks and levers and latch or hook by which the disk is operated. Fig. 5 is a side view of Fig. 1, as seen from arrow B, a portion of the front side plates being broken away to show the plunger-bar and the lever arrangement of the levers on the far side of the press. Fig. 6 is an enlarged view of the tying mechanism as seen from arrow A in Fig. 1, and showing in section one slotted pinion and one disk and the side of the press. Fig. 7 is a view of the same mechanism as seen from arrow B in Fig. 1, and with the housing and part of the bearings broken away, showing in the lower part a side view of one of the disks with its tangent arms wherewith to grasp and cut and clamp the wire, and the perforation by which the wire is again released and also the lever to operate the disk, and in the upper portion is shown a portion of one of the slotted pinions and the lever by which said pinion is locked in place. Fig. 8 is a view from the opposite side of the mechanism shown in Fig. 7, showing the twist formed and bent by the levers, and with said levers disengaged and ready to drop back again. Fig. 9 is a view of the opposite side of Fig. 5. Fig. 10 is a section view on line X—X of Fig. 5 enlarged, and showing parts below in full lines and showing the wire delivered and ready to be grasped and twisted. Fig. 11 is a similar view as Fig. 10 showing the wire twisted and ready to be bent. Fig. 12 is a detail side view of the trip as seen from arrow D in Fig. 1, with the spring to shift the needle frame outward omitted to retain clearness. Fig. 13 is an enlarged view of the twisted wire and bent ready to leave the twister pinion. Fig. 14 is a view of said twist before being bent, showing the uneven form of the twist, and Fig. 15 shows the tie drawn taut.

Referring to Figs. 1 and 5; 1 and 1' are the top and bottom plates and 3' and 3" are the side plates of the press body secured in position by corner bars 2, 2, 2, 2, forming the body or compression chamber C and bale chamber b.

2', 2', are tension rods extending through cross bars 2" 2" on top and bottom of the press located near the rear end of the body of the press.

3 is a plunger bar provided with a plunger 4 to operate in the compression chamber C.

The above is all arranged as in common use, and will be readily understood.

5 and 5' are pivots or lugs secured to the top and bottom of the press a short distance forward of the bars 2".

6 is a bar bent to a U, and pivoted with its ends on the lugs 5 and 5' and with its closed end set inward a proper distance apart to receive the needles 7, 7. Said needles are preferably formed of a U bar as shown in Fig. 7 or a pipe elliptical in cross-section as shown in Fig. 9, and secured to the frame 6 in position to pass across in front of the forming bale.

45 are sheaves in the free end of the needles to receive the wires. A portion of said needles from the sheaves back for about one-fourth their length are reduced in width to clear the tying mechanism later on noted.

8' is a stay-bar to steady the frame 6 and to form a pivot for an operating bar later on noted.

8 is a curved bar secured to the bottom of the press a short distance back of the feed chamber C and blocked down by a block 9, and projecting with its curved end outward and rearward, and, having its free end turned upward.

11 is a clamp carried by a bolt 10 supported by the bar 8 at a proper height for the clamp 11 to be engaged by one of the bars of the frame 6.

12 is a spring coiled on the bolt 10 between the clamp 11 and the bar 8 to receive the force of the frame 6 when thrown outward.

13 is a bar pivoted with one end on the lug 5' and resting with its other end on the bar 8, and having its said free end turned upward to form the flange 14.

15 is a latch, (see Figs. 9 1 and 12,) having an oblong perforation 17 in the forward portion of its body, and pivoted by a rivet or bolt 16 to the flange 14 and limited in its movement by a lug 18 in the perforation 17 and rigid in the flange 14, and with the latch in position to be engaged with its upper end by the frame 6 and with its lower end engage a plate 19 on the bar 8 in position to hold the latch 15 to near the body of the press.

20 is a bar pivoted on the lug 5', preferably below the bar 13, and projecting to both sides of the press and having its longer end projecting toward the side on which the frame 6 swings and turned edgewise and perforated to receive adjustable therein a rod 21, the opposite end of said rod is pivoted to the bar 13 a short distance back of the latch 15.

22 is a spring on the rod 21 and secured to the bar 13 with one end and with its other end to the bar 20.

23 is a shaft journaled in bearings 24, 24, which are secured adjustably to cross bars 25, 25, on near the rear end of the press.

26 is a hub on said shaft having spokes 27 to engage the bale.

28 is a crank on the lower end of the shaft 23 and connected to the bar 20 by a connecting rod 29.

30 is a crank on the upper end of the shaft 23, and projecting in the opposite direction of the crank 28 and having an extension 31, see Figs. 3 and 5.

32 is a bar pivoted with one end on a bracket 33 secured to the press a short distance forward of the bar 20 and projecting upward and connected by a bar 34 to the crank 30.

35 is a bracket secured to the side of the press forward of the feed chamber C and having pivoted thereto a lever 36 which projects with its bifurcated end inward to be engaged by a lug 37 located on the plunger bar 3 a proper distance back of the plunger 4, and having pivoted on its outward projecting end a bar 38 which is pivoted with its other end on the stay rod 8' of the frame 6. 40 is a trip rod or bar also pivoted on the outer end of the lever 36 with its forward end, and bent to extend to the top of the press and supported adjustably in a bearing 41 located on the press back of the feed chamber C and in a guide 42 secured to the cross bar 2", and with the rear end of said bar bent upward to be engaged by the projection 31 of the crank 30.

43 is a cam or raise on the far and outer corner of the bracket 35 to support the outer end of the lever 36 when shifted to the position seen in dotted lines in Fig. 1.

45' are slots in the plunger for the reception of the needles 7, 7, and 44 are slots in the sides of the press to correspond with the slots of the plunger and the location of the needles and with the slots 44 on the far side or in the plate 3" extending to the rear end of said plate.

47 is a housing, (see Figs. 1, 6 and 7,) blocked out by blocks 50, 50 to a desirable distance and secured to bar 48, 48 which are secured to the press a short distance back of the feed chamber C.

51, and 52 are slotted pinions journaled in bearings 53 and 54 secured to the upper and lower arms of the housing 47.

55 is a shaft rigid in a bracket 56 which is rigid on the press.

57 is a wheel journaled on the shaft 55 and blocked out by washers 58 so its cogged periphery will register with the slotted pinions 51 and 52.

60 is an outward projecting flange on the wheel 57 to receive a flexible band 61.

62 is a tension spring connected to the band 61 and to the free end of the bar 32.

63 is a flange on the opposite side of the wheel 57 to receive a flexible band 64.

65 is a tension spring secured with one end to the band 64 and with its other end to the bracket 33.

66 and 67 are levers pivoted to the forward or projecting end of the bearings 53 and 54, (see Figs. 6 and 8,) and set over a short distance from said bearings and projecting rearward with their free ends in position to be engaged by pins 68 and 69 which are located on the inner side of the gear wheel 57 a proper distance apart.

70 is a bracket secured to the housing 47 a short distance inward from the bearing 53 and having a shoulder 71 to project over the wire 46" and partly over the wires while being twisted, and also having a shoulder 72 projecting downward below the wires; 73 is a similar bracket secured to the bearing 53 and having the shoulders 71 and 72 to control the wires of the pinion 52.

74 is a stud rigid in the downward projecting and far end of the bearing 53 in position to receive a lever 75 located to engage or disengage with its upper end the cogs of the pinion 51, and with its lower end connected by a wire 77 to a lever 76 which is pivoted on the outside of the housing 47 in position to be engaged by its lower end by one of the needles 7, 7.

78 is a spring coiled on the stud 74 and secured with one end on the lever 75 and with its other end on the projecting bearing 53 in a manner to press said lever 75 in to the cogs of said pinion 53 for the purpose of locking said pinions.

81, 81, are disks having tangent arms 82, to grasp the wire, and journaled in bearings 83 and 84 secured to the upper and lower arms of the housing 47 a short distance outward from the bearings 53 and 54, said bearings project along each side of the disks and their arms, and the inner side, the side next to the slotted pinions 51 and 52, form cutting or shearing edges and in connection with shearing edges 85 on the arms 82 are to cut off the wire; and the opposite side of the bearings 83 and 84 are arranged to clamp the wire against the arms 82 to retain the wire.

80', 80' are perforations or openings formed in the bearings 83 and 84 in their outer sides and a proper distance forward of the shafts 80 80 and a specified distance below the upper or clamping portion of the bearings so that when the arms 82 are shifted forward the distance of one movement the arm clamping the wire will shift from the clamp and into the field of said perforations that the wire can disengage said arms. A portion of the bearings 83 and 84 at 80'' at the far side of the perforations 80' are set inward against the arms 82 to form cutting edges to cut the wires 88 off the arms 82 if not drawn off by the bale. The tangent arms are formed to grasp and cut and hold the wire for the next bale, and the cutting edge 85 on the arms 82 is set well back so the wire is well bent around the arm and partly drawn in to the space 86 before being cut off on the opposite side of the arm.

87, 87 are tension bolts extending through the projecting ends of the bearings 83, and 84 by which the tension or pressure on the wire at 88 can be regulated and the wire prevented from pulling out as the forming bale shifts back. The bearings 83 and 84 are of elastic material so the tension on the wire can be regulated by the bolts 87, 87.

90 and 90' are levers pivoted on the shafts 80, 80, and projecting rearward in position to be engaged by pins 91 and 91' which are located on the outside on the wheel 57.

93, 93, are latches or hooks pivoted on the levers 90, and 90' and projecting downward in position to engage the arms 82 to turn said disks forward as the levers are raised.

94 94 are pins in the bearings 83 and 84 located to limit the downward movement of the levers 90' and 90; and 95, 95 are pins on the bearings 53 and 54 located to limit the downward movement of the levers 66 and 67.

96 is a pin located near the cogs and outer side on the wheel 57 limiting the rearward and forward movement of said wheel 57 by coming in contact with the shoulder 97 or against the corner 98 of the bearing 53.

To operate the mechanism: The wire 46 is passed through the needles and over the sheave 45 and back to the position seen at 46' in Fig. 10, and the disks 81, 81 shifted the distance of one arm 82 forward by the levers 90 and 90' and hooks 93, 93, operated by the pins 91 and 91' on the wheel 57 thereby clamping the wire 46 after which the needles 7, 7 are withdrawn to the position seen in Fig. 1 in dotted lines, and the wire 46 becomes the wire 46' and as the bale is being formed the wire 46' drifts back and becomes the wire 46''. And as the bale forms or drifts back and outward it will turn the shaft 23 by the spokes 27 engaging the bale, and as the crank 28 is rotated it will during its first half turn draw the near end of the bar 20 backward and shift the opposite end forward to the position seen in dotted lines in Fig. 1 and by the spring 22 on the rod 21 will shift the bar 13 from the position seen in dotted lines in Fig. 1 to the position seen in full lines in Fig. 1 and causing the latch 15 to drop back of the plate 19 and during the second half turn of the shaft 23 the bar 20 is again moved to the position seen in full lines in Fig. 1 thereby tensioning the spring 22 as the bar 13 having been locked by the latch 15. During the first half turn of the crank 30 on the upper end of the shaft 23 it will shift the bar 32 forward and slacking the spring 62 enabling the weaker spring 65 to unwind the band 64 from the flange 63 and turning the wheel 57 in the opposite direction of the arrow in Fig. 7, and winding up the band 61 until the pin 96 will come against the shoulder 98 when the slot 51'' will register with the needles or the wires 46' as seen in Fig. 7. During the second half turn of the crank 30 the bar 32 is again moved back and the spring 62 is tensioned; the wheel 57 having been locked by reason of the lever 75 being in contact with the cogs of the slotted pinion 51. As the crank 30 nears the end of its second half turn the projection 31 will start to ride on the rear and upward projecting end of the bar 40 depressing said end thereby raising the opposite end of said bar and raising the outer end of the lever 36 and depressing the inner end of said lever 36 down into the path of the lug 37; if the plunger 4 has passed inward and the lug 37 has passed the lever 36 then said lever will be retained in said position by reason of the elevated part of the bar 40 being of ample length to prevent the projection 31 of passing beyond it during a fourth of a turn; of the crank 30; there is ample elasticity in the bar 40 and the lever 36 to allow the inner end of the lever 36 to rise to allow the lug 37 to pass beneath said lever if on the wrong side when said lever is depressed. As the plunger 4 is moved inward, by mechanism not shown, and the inner end of the lever 36 having been depressed the lug 37 will move against the longer prong of said lever and shifting the lever from the position seen in dotted lines in Fig. 1 to the position seen in full lines in Fig. 1 thereby drawing the needle frame 6 forward and shift the needles 7, 7 through the press and through the slots of the plunger, and also drawing the bar 40 forward and causing the rear end of said bar to disengage from beneath the projection 31. As the needles 7, 7 pass across the front end of the bale they deliver the wires 46' in to the slots 51'' of the pinions 51 and 52 and across the arms 82 of the disks 81, 81, and as said needles near the end of the stroke one of said needles, (the lower one in the present instance,) will move against the lever 76 and moving it outward thereby shifting the upper end of the lever 75 in the opposite direction and unlocking the slotted pinion 51 and allowing the spring 62 to turn the wheel 57 in the direction of the arrow in Fig. 7 and turn the slotted pinions 51 and 52 to form the twist; as the wheel 57 starts to rotate the pins 91 and 91' engage the levers 90 and 90' and turn the disks forward the distance of one arm, (one sixth of a turn in the present instance,) thereby cutting off and clamping the wire 46' and also cutting off again the wire 46''; as the wheel 57 nears the end of its forward movement the pins 68 and 69 come in contact with the levers 66 and 67 and move said levers to the position seen in full lines in Fig. 8 thereby bending the formed twist to near a right angle as seen in Fig. 6 and also partly drawing the wires out of the slots 51'' by the time the pins 68 and 69 have moved beyond the levers 66 and 67 the wheel 57 will stop by the pin 96 coming against the shoulder 98. As the needle frame 6 is moved inward or forward the lower bar 6 moves against the upper end of the trip 15 and pressing it back and thereby disengaging the lower end of said trip from the plate 19, and as the plunger rebounds or is drawn back (by mechanism not shown,) and the lever 36 is allowed to shift to the position seen in dotted lines in Fig. 1 the spring 22 will shift the needle frame to the position seen in dotted lines in Fig. 1. And the energy of the spring 22 and the energy of the momentum of the needle-frame will force said needle-frame into the clamp 11 where it will be retained until again drawn out by the lug 37 engaging the lever 36. As the plunger rebounds the bale will expand forward and drawing the formed twist forward beyond the brackets 70 and 73 and toward the bale and drawing the wires taut and thereby causing the twist to start to unroll and as said twist starts to rotate to unroll the crooked ends or end will come in contact with the bale or with the strand of wire around the bale or bundle and stop said unrolling and cause the tie to form to the position seen in Fig. 15, which cannot unroll any farther. After the tie is formed the bale is drifted out in the usual way and the operation above described is repeated.

The wires are cut off at the beginning of the forming of the twist to prevent the wire being twisted on both sides of the pinions 51 and 52 or between the pinions and the disks 81. A clear space is provided between said pinions and the disks in which the ends of said wires can play as the pinions 51 and 52 rotate and form the twists on the opposite sides of said pinions. If the press receives a feed during the last stroke for a bale than during the last part of the inward movement of the plunger the far end of the bale will be shifted onward and during the last of such movement of the bale it will draw the wire 46'' partly out of the disks or arms 82 as soon as said arms move into the field of the perforations 80', but such portion as is not drawn out will be cut off by the next arm 82; and if the press receives no feed during the last stroke for a bale then the wire 88 will remain bent firmly around the arm 82 as seen in Fig. 4 until it is cut again on the near or opposite side by the far edge 80'' of the perforation 80' after which the cut pieces of the wire will drop out of the way. The levers 90 and 90', and 66 and 67 will have ample elasticity when resting on the pins 94, 94, and 95, 95 to allow the pins 91 and 91' and 68 and 69 on the wheel 57 to pass said levers when the wheel 57 is turned back by the spring 65. The shafts 80, 80 of the disks 81, 81 are set back of the center of the slotted pinions 51 and 52 far enough to bring the wires 46' and 46'' to near the center of the pinions when delivered on the arms 82. As the needles 7 7 swing outward and the lever 36 is moved back to the position seen in dotted lines in Fig. 1, said lever will during the first part of said movement move off the cam 43 and allowing the outer end of the lever 36 to lower which will raise the rear end of the bar 40 and cause said bar to shift above the projection 31 as it is shifted back, and the lever 36 will not be disturbed until the crank 30 completes its next revolution. If the needles should hang in the press and the spring 22 should be unable to withdraw said needles then the lug 37 playing between the prongs 36' and 36'' will move against the prong 36' and shift the lever 36 back to the position seen in dotted lines in Fig. 1 and shift the needles out by the bar 38 as the plunger rebounds or is shifted outward. The outer end of the lever 36 drops down to the position seen in full lines in Fig. 9 by reason of gravitation on account of carrying one end of the heavy bar 38. The bracket 42 limits the vertical and lateral movement of the rear end of the bar 40 to within the reach of the extension 31 or crank 30. The brackets 70 and 73 are set back to bring their front edge about on line with the center of the pinions 51 and 52 as seen in Fig. 10, to enable the bent wire when being drawn out by the expanding bale to pass out forward of said brackets 70 and 73 and prevent straightening said bend. The shoulders 71, 71 forming the extension 72, 72 on the brackets 70 and 73 are cut back far enough to give the wire the uneven roll or twist shown plainest in Fig. 13, namely, causing the wire 46″ to wind around the wire 46′ to a certain extent and the wire 46′ turning to some extent on its own axes by reason of the greater angle of the wire 46″ to the wire 46′ to the twist. This uneven twist is very desirable as it leaves the wire 46′ the strongest, which in practice, it is found is the first that will break when excessive strain is applied to the tie, and second the uneven twist will cause the twist to take a greater lateral swing, as indicated in dotted lines in Fig. 14 when the twist is started to unroll and stops such unrolling earlier. The proportions of the wheel 57 to the pinions 51 and 52 depend on the number of twists or turns it is desired to give to the wire, four turns of the pinions 51 and 52 will place plenty of twist in the wires to form a good tie. The needles 7, 7 are preferably left straight and their free ends set outward, as shown in Fig. 1, then as the needles are moved inward their free ends or the sheaves 45 will move inward and clear the pinions 51 and 52 and the disks 81, 81 and at the same time deliver the wires far into the slots 51″, 51″ and onto the arms 82, 82 when drawn straight from the sheaves 45, 45 to the forward end of the bale. And as the needles are moved outward they will move away from the bale and thereby be less liable of hanging on the expanding bale.

In forming elastic material into bales and tying same it is desirable to have some slack in the tie or wire to prevent the breaking a light tie; for this reason my tying mechanism is blocked far out from the press by the blocks 50 and 58 for very elastic material such as dry crab-grass, and set in against the press for less elastic material such as green cane.

This tying mechanism has been shown and described as employing only two wires to the bale, but the mechanism can be constructed for any number of wires to the bale; which depends only on the size of the bale and the size of the mechanism. Various other changes can be made in the mechanism without departing from the spirit of my invention.

What I claim is:—

1. In a tying mechanism, a housing adjacent the press, slotted pinions in said housing, a gear-wheel in mesh with said pinions, means to operate said gear-wheel, means to deliver wire around the bale and to the slotted-pinions to form a tie by twisting the wires together, levers arranged to bend said twists, and means on the gear-wheel to operate said levers.

2. In a tying mechanism, a housing adjacent the press, slotted pinions in said housing, a gear-wheel in mesh with said pinions, means to operate said gear-wheel, means to deliver wires around a bale and to the slotted pinions to form a tie by twisting the wires together, levers arranged to bend a part of said twisted tie and partly disengage the wires from said slotted-pinions, and means on the gear-wheel to operate said levers.

3. In a tying mechanism, a housing adjacent the press, bearings in said housing, projections on said bearings, disks journaled in said bearings, arms on said disks, means to deliver wires around a bale and to the arms of said disks, means on the arms of said disks and bearings to cut and clamp said wires, and means to operate said disks.

4. In a tying mechanism, a housing adjacent the press, bearings carried by said housing, disks in said bearings, means to deliver wires around the bale and to said disks, arms on said disks to grasp and clamp and cut the wires, means on the opposite side of said arms to cut the wire off said arms, and means to twist the wires together to form ties.

5. In a tying mechanism, a housing adjacent the press, bearings in said housing, disks in said bearings, arms on said disks, levers, hooks pivoted on said levers to engage the arms of the disks, means to operate said levers, means to deliver wires around the bale and to said disks, and means to twist said wires to form ties.

6. In a tying mechanism, a housing adjacent the press, bearings carried by said housing, slotted pinions in said bearings, a gear-wheel in gear with said pinions, a lever arranged to lock one of said slotted pinions, a spring connected to said gear-wheel, means to tension said spring to operate the gear-wheel.

7. In a tying mechanism, a housing adjacent the press, bearings carried by said housing, slotted pinions in said bearings, a lever arranged to lock one of said pinions, means to deliver wires around the bale and to the slotted pinions and to clamping means, means carried by the housing to unlock the slotted pinions, and means to operate said slotted pinions.

8. In a tying mechanism, a housing adjacent the press, bearings carried by said housing, slotted pinions in said bearings, disks carried in bearings in said housing, arms on said disks said arms being provided with clamping and cutting edges, means to deliver wires around the bale and to the slotted pinions and to the arms of the disks, means to operate said disks at the commencement of the forming of the twists, and means to operate the slotted pinions.

9. In a tying mechanism, slotted pinions journaled in bearings adjacent the press, a lever arranged to lock one of said slotted pinions, means to deliver wires around the bale and to said pinions, a gear-wheel in gear with the pinions, a flange on said gear-wheel, a flexible band on said flange, a spring to operate said band, and means for unlocking the slotted pinions to release the gear-wheel.

10. In a tying mechanism, a housing adjacent the press, bearings in said housing, slotted pinions in said bearings, a lever arranged to lock one of said slotted pinions, means to deliver wires around the bale and to the slotted pinions, a gear-wheel in mesh with said slotted pinions, a flange on the gear-wheel, a band on said flange, a spring to operate said band, a second flange on said gear-wheel, a flexible band on said second flange a spring to operate said band, and means to operate said spring.

11. In a tying mechanism, slotted pinions journaled in bearings adjacent the press, a lever arranged to lock one of said slotted pinions, a gear-wheel in gear with the pinions, a flange on said gear-wheel, a band on said flange, a shaft having a crank, a bar pivoted to the press and connected to the crank, a spring connected to said bar and to the band, and means to operate the shaft to tension the spring.

12. In a tying mechanism, a press body, a plunger bar a plunger thereon to operate in the press, a needle frame pivoted on the press, needles secured therein adapted to operate in slots of the press, a bracket secured to the press, a lever pivoted on said bracket and projecting with its inner end over the plunger bar and connected with its outer end to the needle frame, a lug on the plunger bar to engage with the lever to operate the needles.

13. In a tying mechanism, a press body, a plunger bar, a plunger thereon to operate in the press, a needle frame pivoted on the press, a bracket secured to the press, a lever pivoted on said bracket and projecting with its inner end over the plunger bar and connected with its outer end to the needle frame, a second bar pivoted to the outer end of the lever and supported adjustably in a bracket on the press, means to depress the opposite or free end of said second bar, a lug on the plunger bar to engage with the lever.

14. In a tying mechanism, a press body, a plunger bar, a plunger thereon to operate in the press, a needle frame pivoted on the press, needles secured therein adapted to operate in slots of the press, a bracket secured to the press, a lever pivoted on said bracket and connected by a bar to the needle frame, a second bar pivoted to said lever and supported adjustably in a bracket on the press, a shaft having a crank, means on said crank to engage with the projecting end of the second supported bar, a lug on the plunger bar to engage with the pivoted lever, and means to operate the shaft.

15. In a tying mechanism, a press body, a plunger bar, a plunger thereon to operate in the press, a needle frame pivoted on the press, needles secured thereon adapted to operate in slots of the press, a bracket secured to the press, a lever pivoted thereon with one end projecting over the plunger bar and having said end beveled outward and with its opposite end connected to the needle frame, a lug on the plunger bar to pass beneath said lever, and means to elevate the outer end of said lever.

16. In a tying mechanism, a press body, a plunger bar, a plunger thereon to operate in the press, a needle frame pivoted on the press, needles secured thereon to operate in slots of the press, a bracket secured to the press and having a cam or a raise on said bracket, a lever pivoted on said bracket and having its inward projecting end bifurcated and its outward projecting end connected to the needle frame, a lug on the plunger bar to engage with the bifurcated end of said lever to operate the needle frame.

17. In a tying mechanism, a press body, a needle frame pivoted thereon, a bar pivoted to the press, a latch on said bar, means to lock said latch, means to shift the needle frame inward and unlock said latch, and means to operate said pivoted bar, to move the needle frame outward.

18. In a tying mechanism, a press body, a needle frame pivoted to the press, a bar pivoted to the press, a second bar pivoted to the press, a rod carried by said second bar and connected to the first said bar, means on the rod to shift the first said bar back and to lock said bar in position, and means to operate the second said bar.

19. In a tying mechanism, a press body, a needle frame pivoted to the press, a bar pivoted to the press, a latch thereon, means to lock said latch, a second bar pivoted to the press, a rod carried by the second bar and connected to the first said bar, a spring connected to the first said bar and to the second said bar, and means to operate the second said bar.

20. In a tying mechanism, a press body, a needle frame pivoted to the press, a bar secured to the press and projecting outward, a bolt in said bar, a clamp or friction grip on said bolt to receive and hold the needle frame, a spring between the bar and the clamp or friction grip to receive the momentum of the swing of the needle frame.

GEORGE SCHUBERT.

Witnesses:
F. H. ALLEN,
A. P. GROGAN.